May 17, 1949.   R. J. MARCOU   2,470,630
LIQUID LEVEL ALARM PARTICULARLY FOR
STORAGE BATTERY ELECTROLYTES

Filed Sept. 7, 1946   3 Sheets-Sheet 1

Inventor
Rene J. Marcou
by Emery, Booth, Townsend, Miller & Weidner
Attys

May 17, 1949.  R. J. MARCOU  2,470,630
LIQUID LEVEL ALARM PARTICULARLY FOR
STORAGE BATTERY ELECTROLYTES
Filed Sept. 7, 1946  3 Sheets-Sheet 2
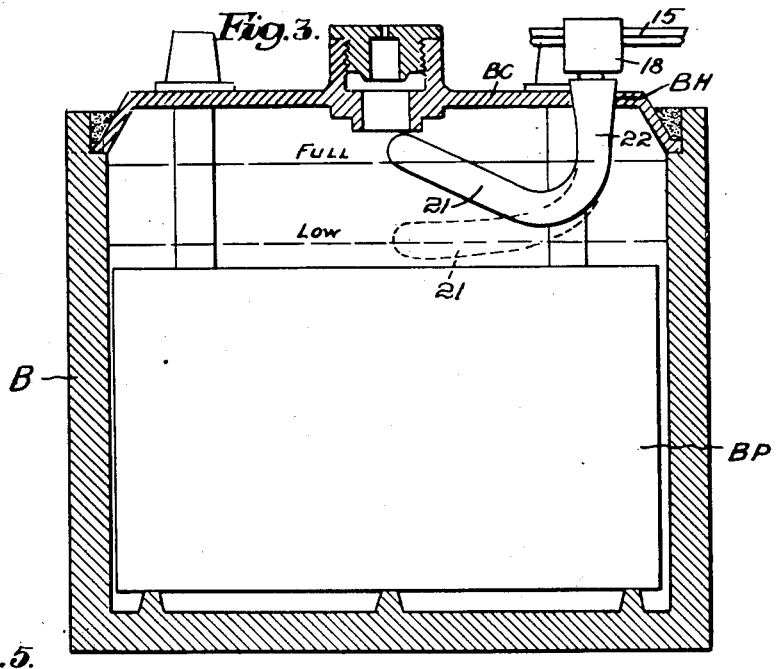
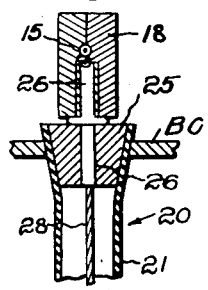
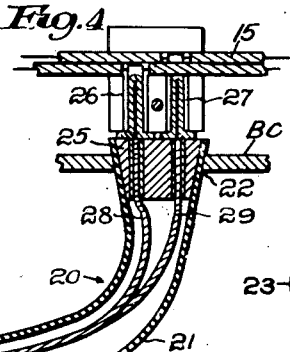
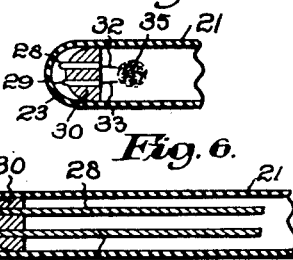
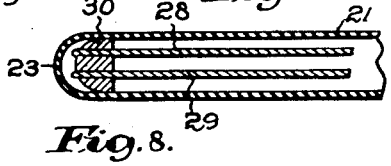
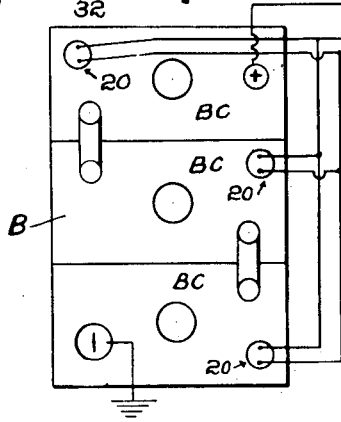
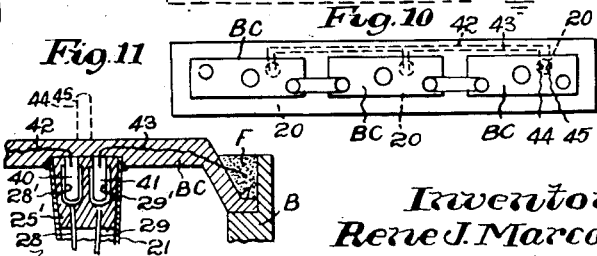
Inventor:
Rene J. Marcou
by Emery, Booth, Townsend, Miller & Widner
Attys

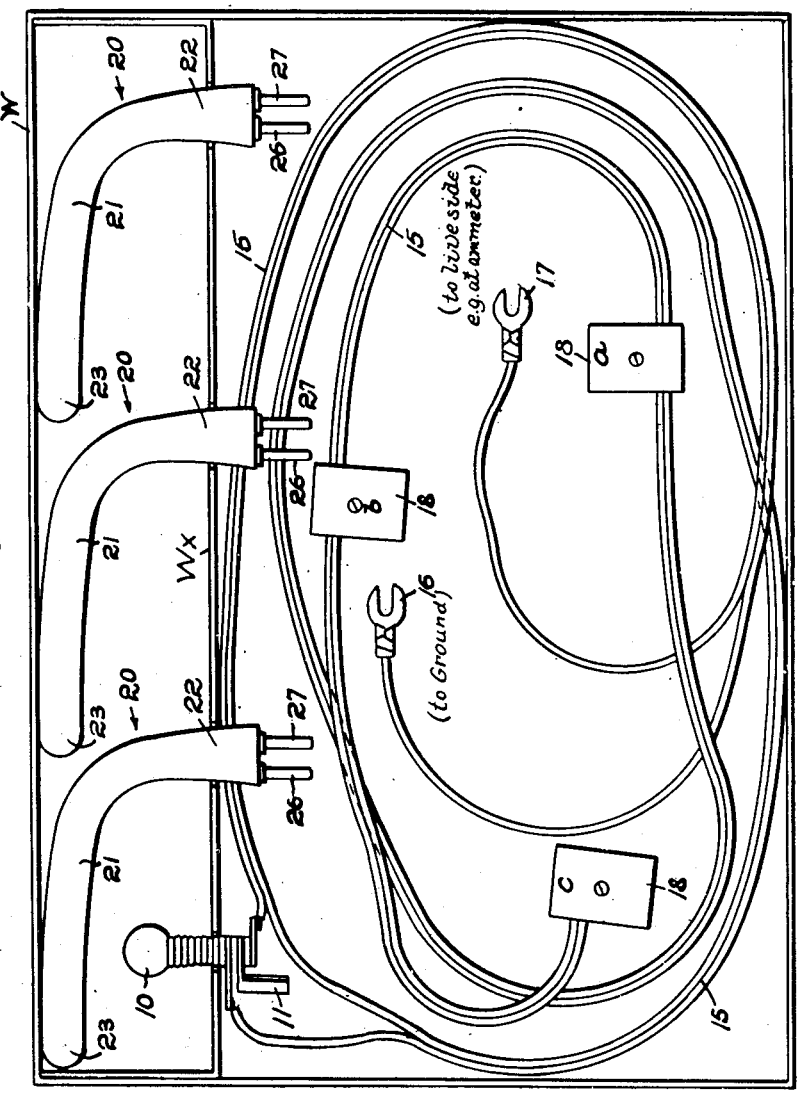

Patented May 17, 1949

2,470,630

UNITED STATES PATENT OFFICE 2,470,630

LIQUID LEVEL ALARM PARTICULARLY FOR STORAGE BATTERY ELECTROLYTES

Rene J. Marcou, Newton, Mass.

Application September 7, 1946, Serial No. 695,514

9 Claims. (Cl. 200—84)

1

This invention relates to alarms, more particularly for informing of critical change in the level of liquid supplies. While broadly applicable in connection with any liquid, the system and means of the invention is especially adapted for warning of volume depletion of the electrolyte of storage batteries, including those of automobiles, boats, airplanes, and other installations for motor starting, ignition, lighting, radio or any electrical energy requirements.

In the drawings illustrating by way of example one embodiment of means typifying the alarm and system of the invention:

Fig. 3 is a vertical section corresponding to Fig. 2, through one of the battery cells;

Fig. 4 is a sectional view on a somewhat larger scale of an individual alarm circuit controller;

Fig. 5 is a corresponding partial section, at right angles to that of Fig. 4;

Figs. 6 and 7 are detail sections as on the lines 6—6 and 7—7 of Fig. 4;

Fig. 8 is a wiring diagram;

Fig. 9 shows a unit assembly or set of the signal system parts packaged for distribution as automotive and the like accessory equipment; and Figs. 10 and 11 illustrate a storage battery having the signal-circuit controllers or switches built in as original parts thereof, Fig. 10 being a plan view on a relatively small scale and Fig. 11 being a detail section at the top of a battery cell.

Maintenance of an adequate plate-covering supply of electrolyte in storage batteries has long been a problem. In many automobiles currently in use the batteries are in locations somewhat difficult of access, under the driver's seat or the floor boards of the driver's compartment, where inspection involves some effort and so is frequently neglected with resultant injury to the battery through drop in the electrolyte level. In some of the more recent car models the battery is set under the hood in the engine compartment, presumably for more ready inspection. This does not solve the problem however, particularly as the heat conditions in the engine compartment make for faster evaporation of the electrolyte. Hence more frequent inspection is in order, and again the effort-resisting human factor is likely to give rise to the similar neglect and battery

2 impairment through unobserved critical drop of the electrolyte level.

By way of correction for such battery maintenance difficulty the present invention furnishes simple, inexpensive and readily installed means for signalling to the driver in the course of ordinary operation of the car that the battery electrolyte demands corrective attention, namely, the addition of water to one or more of the cells.

Figure 1:
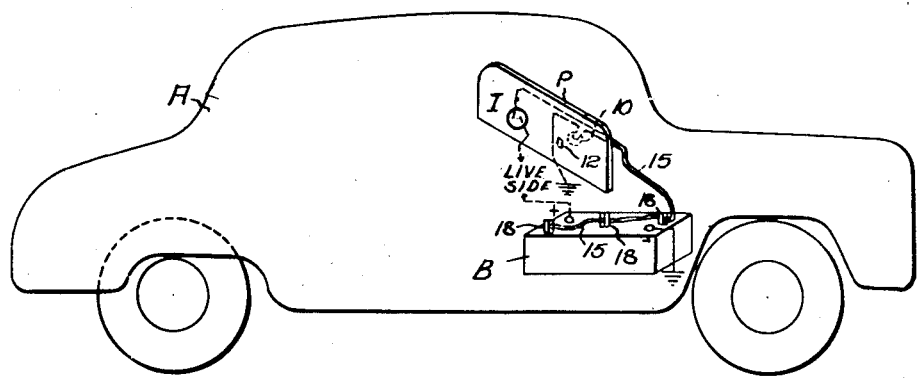
Fig. 1 is a somewhat schematic phantom perspective view of an alarm installation for an automobile battery.

In the partly schematic showing of Fig. 1 an automobile of modern design is indicated generally at A. The storage battery B is in this instance assumed to be suitably mounted in the engine compartment, as on a bracket or in a holder at the front face of the dividing panel between the engine and the driver's compartments, or at any other appropriate location. The customary instrument panel is designated at P, one of the usual electrical instruments in circuit with the battery, such as the ammeter, being indicated at I. The latter is represented as serially connected in the usual manner in the "live" side of the main line from the battery B. It is immaterial to the invention which side of the battery is "live" and which connected to ground, some cars having one arrangement and others the reverse.

Noting particularly Fig. 9 as well as Fig. 1, the alarm system comprises a signal element 10 to be located for easy observation or sensing by a driver seated at the steering wheel. Such signal means may be of any preferred type and form. Herein I have shown for the purpose an electric light bulb having a bracket 11 for mounting on or at the rear of the instrument panel P. In front of the light 10 the panel P has a small window or light-display aperture 12 with which may be associated a translucent member of distinctive color, usually red, appropriate for warning purposes. It will be understood that the light signal 10 may be variously constructed, arranged and mounted for ready viewing by the operator; also that an audible signal element, buzzer or the like may be substituted and that both visual and audible means may be employed in series.

The alarm system and apparatus of Fig. 1 further comprises in the unitary assembly an electric cable or conductor cord designated generally at 15, adjacent ends of the conductors having terminal clips or the like 16, 17 for connection of the assembly as a whole across the main battery circuit, for example one to a terminal of the instrument I and the other to ground at any convenient connection point. The electric light or other signal 10 is connected in series with one conductor, in appropriate spacing from the connector terminals 16, 17 to accommodate the latter and the light to the particular size and arrangement of instrument panel P. In some instances, where the panel P is itself grounded, the signal bracket 11 may be constructed as the ground connection, in which case the ground-connecting clip 16 and the length of wire between it and the signal may be dispensed with.

The conductor cord assembly further has incorporated in circuit with it a plurality of alarm-circuit controllers or switches 20, one for each of the cells of the battery B, three being shown in Fig. 1. The switches 20 individually are in parallel relation, so that any one of them is adapted to close a series circuit through the cable 15 and the signal 10. The cord 15 is of a length to present the switches or circuit closers 20 at the several cells of the battery of the particular car, so as to close the signal circuit upon critical drop of the electrolyte level at any cell.

As will be apparent from the following description the signal switches 20 are adapted for installation at the respective battery cells, removably if desired. Accordingly the cable 15 preferably is further provided with plug-in or other readily detachable electrical connectors 18 for connection to the switches. Thus the cable 15 may when desired be disconnected from the battery B and the alarm switches 20 thereat, for removal of the battery or other reason. It is contemplated that where the alarm system of the invention is incorporated as original equipment the switches 20 will be built-in by the battery manufacturer and the signal and wiring installed by the automobile maker. For existing cars and others not so initially equipped the entire electrolyte alarm system may be unitarily assembled as a set of plug-in and quick-attachable equipment, conveniently packaged for retail distribution and sale in some such manner as shown by way of example in Fig. 9. To install such signal set all that is needed is to drill a small mounting hole BH in each cell top cover BC and insert the respective switch 20 thereat, to attach the light signal bracket 11 at the instrument panel or other convenient support, and to connect the cord terminals 16, 17 across the battery circuit, one to ground and the other conveniently at one of the ammeter or other electric instrument terminal posts as represented in Fig. 1.

Figure 2:
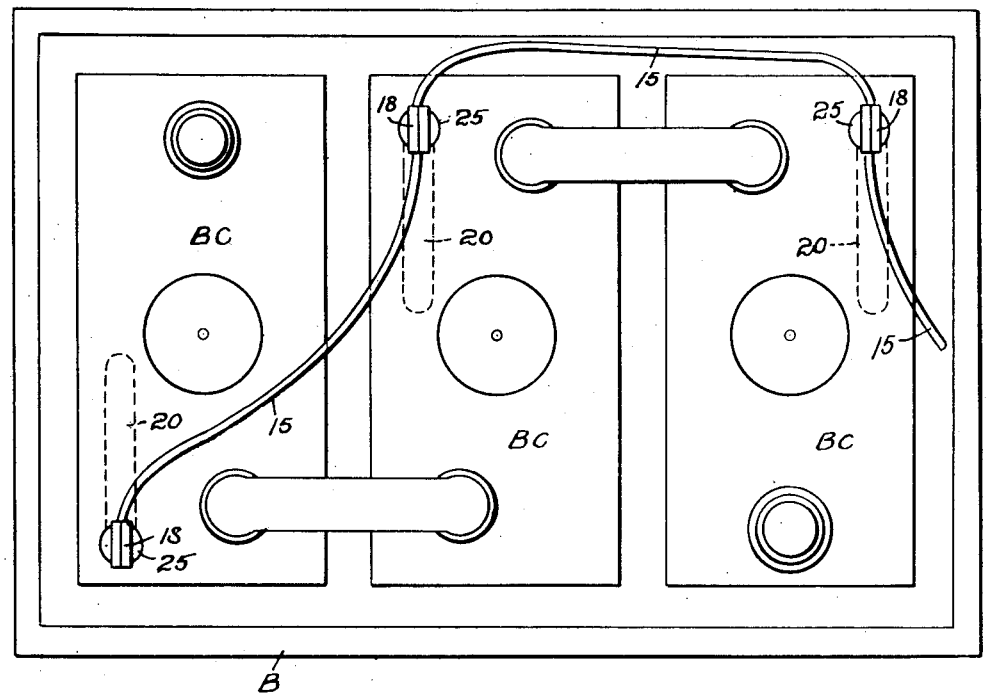
Fig. 2 shows in top plan a storage battery having a signal-circuit controller at each of the cells.

Now considering the signal set and system in more detail, noting particularly Figs. 3 to 7 and 9, it will be understood from the foregoing that an alarm circuit-maker or switch responsive to drop in the electrolytic level desirably is provided for each of the battery cells, of which usually there are at least three. In different batteries the cells may be in lateral line as in the example of Fig. 2 or in longitudinal line, depending on the use and the car, boat or airplane manufacturer's selected location for the battery. The equipment of the invention, such as the packaged set as shown in Fig. 9, is proportioned and arranged as to length of the cord 15 and the relative locations of the detachable plugs or connectors 18 as to accommodate it to any standard or other battery design.

As best seen in Fig. 4, each switch 20 comprises a flexible elongated hollow tubular main element, body or carrier 21 adapted to be supported by one end with the other end extending freely to and buoyed by the electrolyte so as to flex vertically with change in the electrolyte level. This tubular element 21 is of a rubberous or like composition which is electrically non-conductive and is resistant to the acid electrolyte. Suitable materials for the purpose are natural rubber, latex and various of the synthetic rubbers and plastic compositions which are moldable into tubes having the desired resiliency, flexibility and buoyancy. These resiliently flexible hollow tubular bodies 21 conveniently may be fashioned by dipping an appropriately shaped form into a solution or liquid supply of the rubberous or like composition, allowing the accumulated coating to set and thereafter stripping the tubular body from the form by inside-out reversal.

For storage batteries such as illustrated the switch bodies 21 are initially formed with a longitudinal curvature so that in the natural or relaxed position they are arcuate, in shape resembling a beckoning forefinger. The body is initially open at one end 22, the other end 23 being closed. When the body is vertically supported at the open end 22 as in Figs. 3 and 4 the closed end portion 23 desirably is self-supporting in a substantially horizontal position, noting Fig. 4 and the dotted position of Fig. 3. The overall length of the tubular body 21 and the curvature are calculated to accommodate it for installation in the space between the plates BP and the top cover BC of the usual storage battery cell.

As stated, the hollow tubular body 21 of the described construction is buoyant, so that the freely extending part and particularly the closed end 23 will float in or upon the electrolyte under the buoying action thereof. As installed, the attaching end 22 is held stationary, while the projecting portion and closed end 23 is free to follow the liquid level. Under the desired "full" electrolyte level the closed end 23 is elevated substantially as in the full line position in Fig. 3 associated with the level line marked "Full." As the level drops the free part of the body 21 moves down by gravity aided by the inherent resiliency of the body which seeks to assume the less bent or natural relaxed dotted position at the "Low" level, Fig. 3.

The broken horizontal "Low" line on Fig. 3 designates the level of electrolyte depletion selected for signalling by closure of the alarm circuit. Generally this is somewhat above the plates BP and preferably the switch 20 as a whole is constructed, proportioned and arranged for such closure substantially at the maximum straightened or relaxed natural position of the body 21. In this latter or "on" position of the switch the free part of the body desirably is self-supporting and stands slightly spaced above the plates BP regardless of the further fall of liquid, or it may temporarily contact or rest on the plates.

With the attaching end 22 of each switch body 21 fixed as in Figs. 3 and 4 the pendent and closed end portions are free to rise with and be buoyed by the electrolyte as permitted by the resiliency and flexibility of the body wall. The intermediate tubular portion in effect functions as a flexure hinge. Thus it is important that at least a substantial intermediate length of the tubular body 21 is of adequate flexibility to respond with a buoyant hinging action as between the dotted and the full line positions of Fig. 3 under change in the electrolyte level. Flexibility for the terminal portions 22 and 23 of the body is less important—indeed such portions may be relatively rigid—but for general efficiency and ease in manufacture the tubular wall of the body 21 is substantially uniform throughout.

Thus the tubular switch body 21 constitutes in cooperation with the electrolyte the movable actuator or controller for the switch. It also serves as a closed container and holder for the electric contact elements or circuit-closing means proper to be described.

For supporting the switch bodies 21, herein with capacity for removal for inspection or replacement the initially open and supporting end of each is expansively fitted about an insulating plug or stopper-like member 25, the latter suitably sealed in the tubing mouth. The plug 25 in turn serves as the supporting base for a pair of contact pins or posts 26, 27 extending inwardly through the plug 25 in laterally spaced relation. The inner ends of the posts 26, 27 are of sleeve-like or other form for electrical connection with preferably insulated conductors 28, 29. As seen in Fig. 4, the posts 26, 27 are tubular and the insulation of the conductors 28, 29 is continued well up into them and electrical connection of the bared ends of the conductors is effected within the projecting portions of the posts 26, 27 above the plug 25.

Inside each switch body 21 the conductors 28, 29 extend lengthwise more or less freely, spaced from the tubular containing wall of the body 21. At or adjacent the closed end wall 23 is a conductor holding and spacing member 30 of relatively non-compressible material as compared with the tubing wall and of light weight, such as a small plug-like body of cork, balsa wood or the like. The conductors 28, 29 are passed through the holder 30 toward the closed end wall 23, see particularly Fig. 6, then down and reversely back through the holder 30, again in mutually spaced relation and so that the ends of the conductors project somewhat back into the hollow interior of the body 21, at or near the bottom wall in the Fig. 4 position; see also particularly Fig. 7.

These rearwardly projecting terminal portions 32, 33 of the conductors 28, 29 are bared as indicated by the parts so numbered in Figs. 4 and 7, these bared portions forming elements of the circuit-closing means proper. The bared conductor terminals 32, 33 extend in proximity to each other but are spaced out of mutual electrical contact. Electrical contact across them is adapted to be established by a movable circuit closer 35. This may be a freely movably body of good conductive metal or of electrically conductive liquid adequate to close contact across the bared wires 32, 33 but to shift freely away from them so as to open the contact under any materially elevated or upwardly deflected position of the switch container body 21 above the down or circuit-closing position of Figs. 4 and 7 and as dotted in Fig. 3. While such freely movable contact 35 may be a steel ball or other relatively heavy rolling mass of good conductive material, preferably I employ for the purpose a liquid and in particular a globule of mercury. This latter in cooperation with the conductors 28—32 and 29—33 and the flexing buoyant housing body 20 responsive to the electrolyte volume level comprise the main parts of the several alarm circuit switches, one for each battery cell.

The manner of operation of the alarm system will be apparent from the foregoing description in connection with the drawings. With the system installed as in an automobile A of Fig. 1, the signal light 10 is "off" so long as all cells of the battery B have the electrolyte substantially above the Low level. Whenever the level drops to the vicinity of the battery plates BP in any one or more of the cells, the corresponding switch or switches 20 straighten down to the circuit-making "on" position of Fig. 4 and as dotted in Fig. 3. Immediately an alarm circuit is closed to the signal 10, displaying the light (red) at the window 12 of the instrument panel (or sounding the audible signal). The signal remains at the "on" warning until each battery cell at which the electrolyte is down receives corrective attention by replenishment. The current consumption of the warning signal 10 is minute, but if desired a push-button or other master cut-out switch may be provided at a convenient point along the cable 15. To avoid unintentional shut-off of the system it is preferred to omit such master switch.

In Fig. 9 one complete set of apparatus embodying my battery liquid level alarm system is shown packaged for distribution as accessory equipment, for sale by garages, filling stations, battery dealers, accessory stores and the like. The conductor cord 15 with attaching terminal clips 16, 17 is coiled in a box or other package W. The signal light 10 with its bracket 11 is connected serially into the cord 15, herein relatively near the attaching clips 16, 17 for installation at an instrument panel P. At the other end of the cord, in appropriate spacing for the several cells of a battery the plurality of switch-connecting plugs 18 are connected in parallel across the cord 15, three being indicated at a, b and c, in that order toward the battery end of the cord or cable. A partition or other convenient holding means Wx in the package W is notched or recessed to hold the cord-attached light 10 and also the set of three alarm switches 20, 20, 20. If preferred the detachable connector plugs 18a, 18b, and 18c may be set onto the posts 26, 27 of the respective switches 20.

Installation of such set of equipment for the alarm system is a simple matter, as already described. The signal bracket 11 is attached by a bolt or screw at or behind the instrument panel, and the cord clips connected to the live and the grounded sides of the main battery circuit. As stated, generally a convenient manner of connection is one clip 17 at the ammeter, and the other 16 to the nearest available ground at or near the panel. Frequently the panel is itself a ground in which case the signal bracket or light socket may itself effect the ground connection by its attachment to the panel. A small drill hole usually about one-half inch in diameter, in each battery cell cover plate enables ready insertion of the flexible liquid-level-actuated switches 20, the stopper-like formation of the post-carrying closed ends 22 of the switches serving as self-sealing closures for the apertures as well as operative mounting supports for the switches.

As herein illustrated the flexible tubular switches 20 have the conductors 28, 29 fixed at one end on the body-closing stopper-like insert 25 and at the other end held and spaced by the light-weight disk or button 30 rounded to conform to the end wall 23 of the switch body 21. Such construction and arrangement facilitates manufacture and assembly of the switch devices. They may however be variously formed, as by molding the conductors in insulated relation on or within the wall of the tubular body, with inwardly projecting bared terminals similarly available for circuit closure as those at 32, 33, Figs. 4 and 7. In any case the manner of mounting and location of the conductors on or within the tubular body is such as to afford for the latter appropriate buoyancy and flexure hinging action under change in the electrolyte level for opening the alarm circuit under adequate supply of the liquid and closing it at the predetermined lower level at which the replenishment warning signal is desired.

It also will be understood that the conductor cord or cable 15 for the set of signal equipment may have the terminals 16, 17, the signal 10 and the plug-on connectors 18 variously arranged upon it, depending on the character of the intended installation. As shown the cable includes plural conductors along the major portion of its length, the switch tubes 20 and the plug connectors 18 therefor being near one end of the cable and the signal 10 and the connectors to the main power circuit being near the other end. This is appropriate where the storage battery is more or less spaced from the location for the signal and both the ground and the live-side alarm-circuit operating connections are conveniently accessible near the signal location, as at an automobile instrument panel. In other cases a single-conductor cord may be employed from the switches 20 at the battery to the signal and through it to any convenient live-side connection in a circuit containing the battery, the other side of the switches being connected to ground wherever convenient or directly to the grounded terminal of the battery. Or if preferred the signal system of the invention may constitute a circuit independent of the one or more storage batteries for which it is to afford an electrolyte level alarm, the signal circuit then receiving energy from its own battery or other power source.

In Figs. 10 and 11 I have shown one example of a storage battery having signal-switch means built into the battery as initial equipment in accordance with the invention. The battery B, while illustrated as of the in-line type of cell arrangement, will be understood as representative of any liquid-electrolyte battery. In this instance all of the inter-switch conductors are contained within the normal confines of the battery itself, being extended in insulated manner along or within the cell top covers BC, where they are insulated by the material thereof, or along in the trough between the cell covers and the upper edge of the battery case, where they are concealed and insulatively protected by embedding in the plastic filler material F.

As seen in the detail section Fig. 11, the stopper-like closure 25' at the mouth of the switch tube 21 is formed with receiving sockets 28', 29' to which the insulated conductors 28, 29 within the tube are connected. The cell cover BC has conductor posts 40, 41 projecting at the under face, with their upper ends connected to the switch-connecting conductors 42, 43 embedded in and extending along through the cell cover and into and along the filler substance F. The arrangement of these conductors 42, 43 whereby the several cell switches 20 are individually parallelly associated is shown partly diagrammatically in Fig. 10. At any selected one of the cells the cover is provided with external posts or other plug-on connectors 44, 45 common to the several switches 20. As shown in Fig. 11, these may be vertically opposite one of the cell switches, for instance that at the right end of the battery of Fig. 10, the inner ends of the externally accessible posts 44, 45 being electrically connected within the cover material or that of the stopper element 25' to the switch-circuit conductors 42, 43, so that each cell switch 20 is individually in circuit with said external connectors 44, 45. Thus a single plug-on connection is all that is required for the line 15 to the signal and the main battery circuit. In other words, the signal circuit for the system as a whole may be substantially as in Fig. 8 and as previously described, the wiring at the left in Fig. 8 being incorporated into the battery itself, with a common lead-off connection for the plurality of cell switches 20.

My invention is not limited to the particular embodiments as herein shown and/or described, its scope being pointed out in the following claims.

I claim:

1. In an alarm system for the level status of the electrolyte of storage batteries of the type having one or more cells containing electrode plates and having cell top covers, an alarm circuit switch for a cell of such battery, said switch comprising a buoyant flexible switch-tube of acid-resistant non-conductive composition receivable in the given battery cell above the plates with one end anchored at the cell top cover and the opposite end portion freely projecting so as to be vertically flexed and buoyed by the electrolyte when present in adequate supply and to straighten downwardly under drop in the electrolyte level, gravity movable contact means carried directly in the flexible switch-tube for shifting from and to circuit-closing position therein respectively under flexing and straightening of the switch-tube, and contact members in the switch-tube for opening and closing engagement by the movable contact means.

2. In an alarm system according to claim 1, the construction in which the switch tube has at its anchoring end a stopper-like formation adapting it for closure seating at an aperture for the purpose in the corresponding battery cell top cover, the contact members in the switch-tube having insulated electrical connections carried by the switch-tube and extending outwardly through said stopper-like formation.

3. An alarm-circuit switch device particularly for installation above the plates in a storage battery cell for actuation in response to change in the electrolyte level, said device comprising an integral flexible resilient hollow tube of rubberous material having an upright supporting portion and an angularly extending buoyant portion in flexure hinge relation to the upright portion and closed at the end remote from the latter, said closed end having a natural lowered position in the absence of buoying liquid and adapted for buoyant upward flexing by ambient liquid, a pair of electrical contacts in the flexible rubberous tube at an under part of the closed end, gravity-actuated contactor means freely movable in the tube to close a circuit across the contacts in the lowered position of the closed tube end and to move away from the contacts and open the circuit under buoyant upward flexure of the closed tube end, and insulated conductors leading from the contacts to the supporting portion of the tube and externally accessible thereat.

4. An alarm-circuit switch device as in claim 3 in which the supporting end of the flexible rubberous tube has in closing relation thereat a plug of non-conductive material through which the conductors are extended and whereby the tube is adapted for removable seating in the manner of a stopper in an aperture therefor in a storage battery cell top cover.

5. In a device for signalling the electrolyte level of storage batteries of the type having one or more cells containing electrode plates and having cell top covers, an elbow-like hollow rubberous tube comprising generally horizontal and vertical legs and a curved flexure-hinge portion connecting them, the horizontal leg being integrally closed at the free end for buoyant reception by electrolyte of a battery cell and the vertical leg defining a portion for pendent support by a cell top cover and having a non-conductive stopper closing and sealed in the upper end thereof, external connector posts carried by the stopper, insulated conductors connected to said posts and extending to a point adjacent the closed end of the tube and there presenting bare terminal portions, and gravity movable circuit closer means held in and by the tube for movement toward and from the integrally closed end and cooperating with said terminal portions to make and to break a circuit thereat upon flexing lowering and raising of said end respectively.

6. In a storage battery having a case, one or more plate-containing cells each with a cover sealed to the case, means for signalling the electrolyte level comprising for each cell a flexibly hinging rubberous tube having one end secured in sealed relation at the inner face of the cell cover, the other end of the tube being closed and extending freely within the cell above the plates for buoying by the electrolyte, fluid contact make and break means operatively held in and by the closed hingedly movable tube end for actuation in accordance with the buoyantly flexed position of the tube, conductors leading from said means and through the secured end of the tube, and external battery-carried connections for the conductors.

7. In a storage battery according to claim 6, a construction wherein the conductors are in part carried within the cell cover or covers.

8. In a storage battery according to claim 6, a construction wherein the conductors are in part carried within the cell cover or covers and include inter-cell connections embedded in the peripheral sealing means of the covers.

9. In a storage battery according to claim 6, a construction wherein a common plug-in connection is provided for the conductors of a plurality of cells, the means for signalling the electrolyte-level of the several cells being connected in parallel and having the conductor connections insulatively contained in the cell covers and the sealing means therefor.

RENE J. MARCOU.

REFERENCES CITED

The following references are of record in the file of this patent:

UNITED STATES PATENTS

| Number | Name | Date |
|---|---|---|
| 712,699 | May | Nov. 4, 1902 |
| 1,494,625 | Pierce | May 20, 1924 |
| 1,816,993 | Willits | Aug. 4, 1931 |
| 1,818,185 | Yull | Aug. 11, 1931 |
| 2,053,353 | Talbot | Sept. 8, 1936 |
| 2,240,880 | Bennett | May 6, 1941 |
| 2,246,800 | Ingram | June 24, 1941 |
| 2,280,574 | Forse | Apr. 21, 1942 |

FOREIGN PATENTS

| Number | Country | Date |
|---|---|---|
| 43,965 | Austria | Sept. 10, 1910 |
| 135,761 | Austria | July 15, 1933 |
| 135,839 | Austria | Dec. 11, 1933 |
| 184,599 | Great Britain | Aug. 24, 1922 |
| 467,668 | Great Britain | June 21, 1937 |
| 595,690 | Germany | Apr. 16, 1934 |